US010409030B1

(12) United States Patent
Winrow

(10) Patent No.: US 10,409,030 B1
(45) Date of Patent: Sep. 10, 2019

(54) MONOLITHIC FLEXURE MOUNT

(71) Applicant: National Technology & Engineering Solutions of Sandia, LLC., Albuquerque, NM (US)

(72) Inventor: Edward G. Winrow, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 167 days.

(21) Appl. No.: 15/438,200

(22) Filed: Feb. 21, 2017

Related U.S. Application Data

(60) Provisional application No. 62/298,549, filed on Feb. 23, 2016.

(51) Int. Cl.
G02B 7/18 (2006.01)
G02B 7/182 (2006.01)
G02B 23/02 (2006.01)

(52) U.S. Cl.
CPC ............ *G02B 7/181* (2013.01); *G02B 7/182* (2013.01); *G02B 7/1821* (2013.01); *G02B 7/1822* (2013.01); *G02B 7/1824* (2013.01); *G02B 23/02* (2013.01)

(58) Field of Classification Search
CPC .... G02B 7/182; G02B 7/1821; G02B 7/1822; G02B 7/24; G02B 7/181; G02B 23/02; G01B 11/26
USPC ........................................................ 359/872
See application file for complete search history.

(56) References Cited

U.S. PATENT DOCUMENTS

| 5,620,169 | A | 4/1997 | Payne |
| 5,801,891 | A | 9/1998 | Lloyd |
| 5,844,732 | A | 12/1998 | Huiban et al. |
| 6,283,666 | B1 | 9/2001 | Genequand |
| 6,856,437 | B2 * | 2/2005 | Witt ................... G02B 7/1821 248/477 |
| 7,832,880 | B2 | 11/2010 | Craig |
| 8,205,853 | B2 | 6/2012 | Bleier et al. |
| 8,752,969 | B1 * | 6/2014 | Kane ................... G02B 7/1821 356/139.05 |
| 8,992,032 | B2 * | 3/2015 | Glatter ................ G02B 23/16 359/872 |
| 9,500,836 | B2 * | 11/2016 | Marr ..................... G02B 7/003 |
| 2008/0284079 | A1 * | 11/2008 | Rohrer ................. G02B 7/1822 269/55 |

FOREIGN PATENT DOCUMENTS

WO WO 2015053626 A2 * 4/2015 ............ G02B 7/021

OTHER PUBLICATIONS

Smith, S. T., Flexures Elements of Elastic Mechanisms, CRC Press, Boca Raton, FL, 2000, Preface.

* cited by examiner

*Primary Examiner* — Stephone B Allen
*Assistant Examiner* — Rahman Abdur
(74) *Attorney, Agent, or Firm* — Samantha Updegraff; Mark A. Dodd

(57) ABSTRACT

A flexure mount is described herein. The flexure mount includes three different flexures laterally offset from one another along a length of the flexure mount. The flexured design of the flexure mount allows for compliance in certain directions to reduce stress buildup normally associated with rigid mounting of dissimilar materials under dynamic thermal environments.

16 Claims, 3 Drawing Sheets

MONOLITHIC FLEXURE MOUNT

RELATED APPLICATION

This application claims priority to U.S. Provisional Patent Application No. 62/298,549, filed on Feb. 23, 2016, and entitled "MONOLITHIC FLEXURED MIRROR MOUNTS", the entirety of which is incorporated herein by reference.

STATEMENT OF GOVERNMENT INTEREST

This invention was developed under Contract DE-AC04-94AL85000 between Sandia Corporation and the U.S. Department of Energy. The U.S. Government has certain rights in this invention.

BACKGROUND

Optical systems, such as telescopes, include precision surfaces (e.g., mirrors, lenses, etc.) that must be positioned precisely with respect to one another. Mounting precision surfaces is nontrivial, because different components in an optical system are made of different materials, which have different coefficients of thermal expansion (CTE). Therefore, even if great care is taken to initially mount a precision surface to a rigid support structure, alterations in temperature may cause the precision surface to warp or change position due to expansion or contraction of the precision surface and/or the rigid support structure. This problem is exacerbated when the optical system is subject to significant variations in temperature, such as a telescope that is to be operated in outer space.

Conventionally, apparatuses that are configured to absorb stresses have been employed to interface precision surfaces with support structures in optical systems. These conventional apparatuses, however, tend to be machined, multi-part apparatuses, making them difficult to manufacture, bulky, and somewhat expensive. If steps are taken to reduce the size or complexity of one of these conventional apparatuses, robustness of the apparatus is sacrificed, such that performance is degraded when stress is introduced in the optical system (e.g., when there is a change in temperature).

SUMMARY

The following is a brief summary of subject matter that is described in greater detail herein. This summary is not intended to be limiting as to the scope of the claims.

Described herein is an optical system (e.g., a telescope) that comprises a precision surface (such as a mirror or lens), wherein the precision surface is mounted to a rigid support structure by way of a plurality of flexure mounts (which may also be referred to herein as mirror mounts). The flexure mounts act as respective interfaces between the rigid support structure and the precision surface, wherein the flexure mounts absorb stress caused by, for example, expansion or contraction of the precision surface. Each flexure mount has a generally cylindrical profile and is monolithic in nature. The flexure mount includes a first head at a first end of the flexure mount and a second head at a second end of the flexure mount that is opposite the first end. The first head includes a plurality of t-shaped radial flexures that are symmetrically arranged about a center axis of the flexure mount. Each radial flexure in the first head can include a curved injection tunnel having an entrance hole and an exit hole, where the entrance hole is positioned on a side of the first head that is opposite the first end of the flexure mount and the exit hole is positioned on an exterior surface of the flexure mount along a length of the flexure mount.

The flexure mount further includes a plurality of goniometric flexures that are laterally offset from the radial flexures along the center axis of the flexure mount. The goniometric flexures include an inner flexure and an outer flexure, wherein the inner flexure and the outer flexure are orthogonal to one another, and further wherein the inner flexure is nested in the outer flexure. The goniometric flexures have planar exterior surfaces that taper towards the center axis of the flexure mount as such surfaces extend laterally towards the first end of the flexure mount. The goniometric flexures define a pivot point, wherein the pivot point lies in a plane that is defined by center points of the exit holes of the radial flexures. Thus, the goniometric flexures allow for a relatively small amount of rotation about the pivot point while preventing tangential displacement.

The flexure mount additionally includes a pair of main flexures, wherein the main flexures are laterally offset from the goniometric flexures along the center axis of the flexure mount, such that the goniometric flexures are positioned between the radial flexures and the main flexures along a length of the center axis of the flexure mount. The main flexures are planar and extend laterally in parallel with one another. The main flexures allow for flexing of the flexure mount in a direction that is orthogonal to the planar surfaces of the main flexures.

The flexure mount further comprises a second head, wherein the main flexures extend from the second head towards the goniometric flexures. It can, therefore, be ascertained that the monolithic flexure mount has three different types of flexures stacked one on top of the other laterally along the center axis of the flexure mount.

The first head of the flexure mount can be inserted into a recess in a back side of the precision surface. The flexure mount is bonded to a wall of the recess by injecting an adhesive into the entrance holes of the radial flexures, such that the adhesive exits the exit holes of the radial flexures causing the areas of the radial flexures proximate the exit holes to adhere to the wall of the recess. The second head of the flexure mount is attached to the rigid support structure by way of a fastener (and optionally an adhesive). For instance, the second head of the flexure mount can have an aperture that extends laterally therethrough, with its axis being the center axis of the flexure mount. A bolt, rivet, or the like, can extend into and/or through the aperture to securely fasten the flexure mount to the rigid support structure.

Pursuant to an example, a set of three flexure mounts can be employed to mount the precision surface to the rigid support structure, wherein the flexure mounts are positioned equidistant to one another about a center of expansion (COE) of the precision surface. More specifically, the flexure mounts are arranged about the COE of the precision surface to form an equilateral triangle, with the COE of the precision surface being positioned at the center of such triangle. When stress caused by temperature change is induced, the flexure mounts act in conjunction to absorb such stress and cause the COE of the precision surface to remain stationary.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
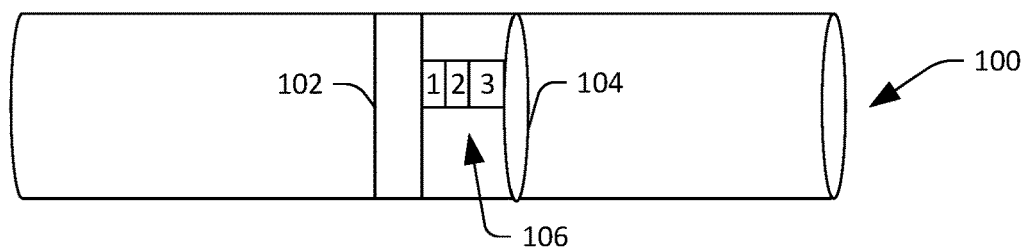
FIG. 1 is a schematic that illustrates an exemplary telescope.

Various technologies pertaining to a monolithic flexure mount are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

With reference now to FIG. 1, a schematic of an exemplary telescope 100 is illustrated. The telescope 100 comprises a rigid support structure 102, which in an example, can be formed at least partially of carbon fiber tubes. The telescope 100 further comprises a precision surface 104, which can be a mirror, a lens, or other suitable optical component. For sake of explanation, the precision surface 104 will be referred to herein as a mirror. The mirror 104 is mounted to the (rigid) support structure 102. More specifically, the telescope 100 includes a monolithic flexure mount 106, which is used to mount the mirror 104 to the support structure 102 of the telescope 100. While a single monolithic flexure mount is illustrated in FIG. 1 as being used to mount the mirror 104 to the support structure 102, it is to be understood that a plurality of monolithic flexure mounts (e.g., a set of three) can be employed to mount the mirror 104 to the support structure 102.

The monolithic flexure mounts of the telescope 100 are configured to cause a center of expansion (COE) of the mirror 104 to remain stationary when the mirror 104 and/or the support structure 102 undergo expansion or contraction caused by variations in temperature. For instance, the telescope 100 may be configured for use in outer space, thereby subjecting the telescope 100 to a wide range of temperatures. As will be described in greater detail herein, and as illustrated by the numerals 1, 2, and 3 in FIG. 1, the monolithic flexure mount 106 includes three types of flexures laterally offset from one another along a length of the monolithic flexure mount 106. These flexures allow, for example, the mirror 104 to expand and contract without causing damage to the mirror 104 and further while causing the COE of the mirror 104 to remain stationary when the mirror 104 and/or the rigid support structure 102 expands and/or contracts due to temperature variations.

Figure 2:
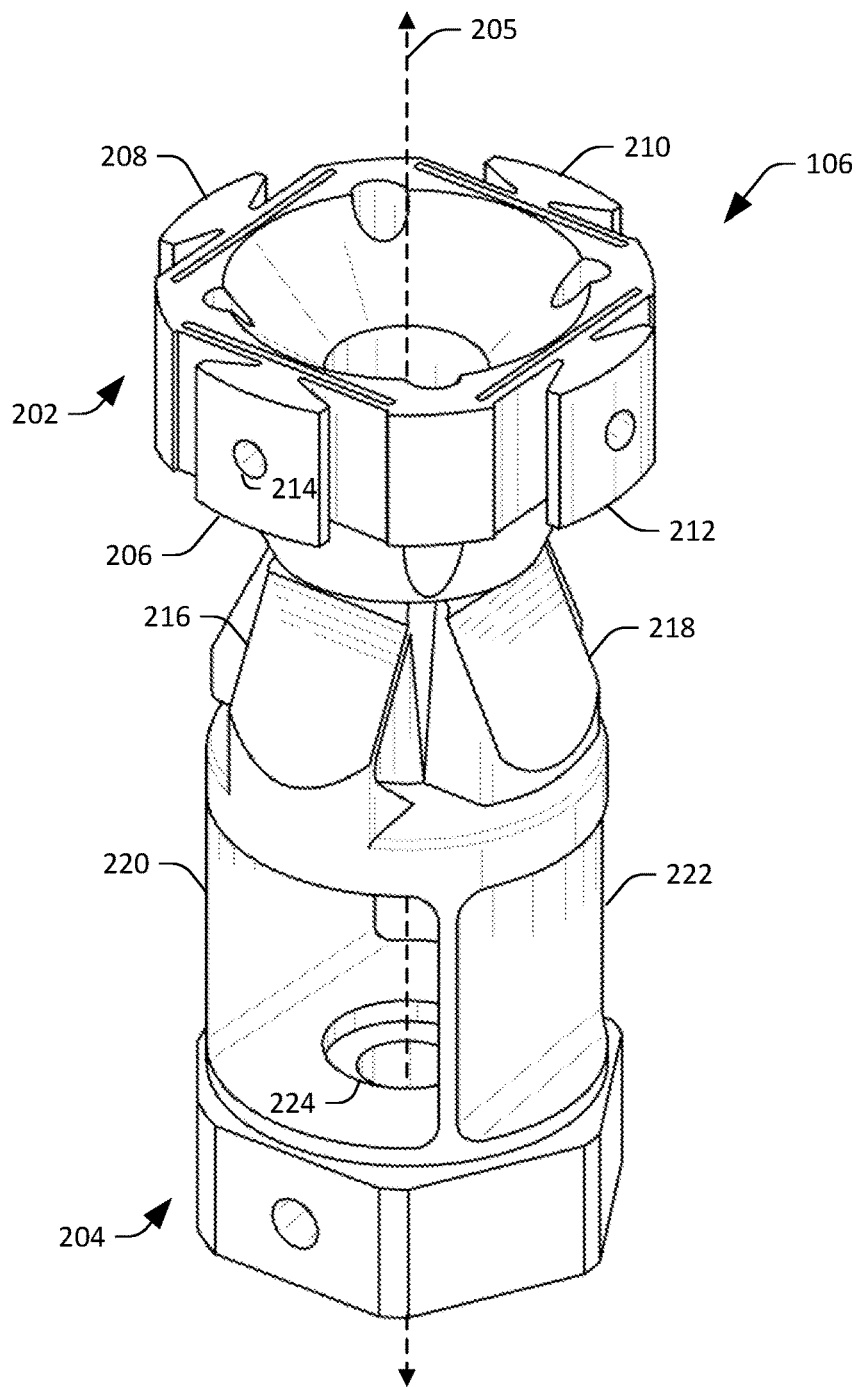
FIG. 2 is an isometric view of an exemplary flexure mount.

Now referring to FIG. 2, an isometric view of the flexure mount 106 is illustrated. The flexure mount 106 includes a first head 202 positioned at a first end of the flexure mount 106 and a second head 204 positioned at a second end of the flexure mount, wherein the first end is opposite the second end along a length of the mount 106. As can be ascertained, the flexure mount 106 has a generally cylindrical profile with a center axis 205 extending therethrough. The first head 202 of the flexure mount 106 is a flexured head that includes a plurality of radial flexures 206-212 arranged symmetrically about the center axis 205 of the flexure mount 106. Thus, the first radial flexure 206 is offset by 180° from the third radial flexure 210, while being offset 90° from each of the second radial flexure 208 and the fourth radial flexure 212. Each radial flexure can be shaped as an elongated T-shaped pad that extends laterally along the length of the flexure mount 106, with planes extending from the bases of the T-shaped radial flexures 206-212 intersecting on the center axis 205 of the flexure mount 106. The tops of the elongated T-shapes of the radial flexures 206-212 define exterior surfaces of the first head 202 of the flexure mount 106.

Each radial flexure further includes a curved injection tunnel having an entrance hole and an exit hole, wherein the curved injection tunnel is configured to provide a passageway for delivery of an adhesive to the surface of the radial flexure at the exterior of the flexure mount 106. For example, the first radial flexure 206 has an exit hole 214 of a curved injection tunnel on the exterior surface of the flexure mount 106. The entrance hole (not shown) is on the underside of the first radial flexure 206 as oriented in FIG. 2, such that the entrance hole lies in a plane that is orthogonal to a plane within which the exit hole 214 lies. In other words, the entrance hole is on the side of the first head 202 that is opposite the first end of the flexure mount 106.

The flexure mount 106 also includes a plurality of goniometric flexures 216 and 218. The goniometric flexure 216 may be referred to as an outer goniometric flexure, while the goniometric flexure 218 may be referred to as an inner goniometric flexure, as the inner goniometric flexure 218 is nested in the outer goniometric flexure 216. The outer goniometric flexure 216 is offset from the inner goniometric flexure 218 by 90°. The goniometric flexures 216 and 218 have planar exterior surfaces that taper inwardly as they extend laterally along the center axis 205 of the flexure mount 106 from their bases toward the first head 202. The goniometric flexures 216 and 218 define a pivot point on the center axis 205 of the flexure mount 106, where the pivot point lies in a plane defined by the exit holes of the radial flexures 206-212.

The flexure mount 106 further comprises a pair of main flexures 220 and 222, wherein the main flexures 220 and 222 are in the form of planar blades that extend laterally in parallel with one another along the length of the flexure mount 106. More specifically, the main flexures 220 and 222 extend from the second head 204 of the flexure mount 106 towards the goniometric flexures 216 and 218, and are laterally offset from the goniometric flexures 216 and 218 along the center axis 205 of the flexure mount 106. Accordingly, as shown, the goniometric flexures 216 and 218 are between the radial flexures 206-212 and the main flexures 220 and 222 along the length of the flexure mount 106.

The second head 204 of the flexure mount 106 has a cylindrical aperture 224 that extends through the second head 204, wherein a center axis of the aperture 224 is coincident with the center axis 205 of the flexure mount 106. As will be described in greater detail herein, the aperture 224 can receive a fastener, wherein the flexure mount 106 can be coupled to the support structure 102 by way of the fastener (and optionally an adhesive). The first head 202 of the flexure mount 106 can be fit into a recess formed in a backside of the mirror 104, and can be bonded to the wall of the recess by way of an adhesive injected through the injection tunnels of the radical flexures 206-212.

As indicated previously, the flexure mount 106 can be a monolithic flexure mount, such that it is a continuous structure formed of a particular material, such as a metal (e.g., titanium, aluminum, steel, copper, magnesium, beryllium, etc.), ceramic, or plastic. The flexure mount 106 can be created by way of additive manufacturing, such that the flexure mount 106 can be relatively inexpensive to manufacture. Further, as the flexure mount 106 does not require several different machined mechanisms coupled the one another, potential weak points in the flexure mount 106 are reduced. Moreover, the flexure mount 106 is lighter than conventional flexure mounts, which is an advantage when used in the telescope 100, which may be employed in outer space.

When mirror 104 is mounted to the rigid support structure 102 using the flexure mount 106, a line extending orthogonal to the planar main flexures 220 and 222 and through the centers of the plan flexures intersects an axis that extends orthogonally from the surface of the mirror 104 at the COE of the mirror 104. Thus, the main flexures 220 and 222 allow for some flexion radially with respect to the COE of the mirror 104, thereby allowing for expansion and contraction of the mirror while causing the COE of the mirror 104 to remain stationary.

Figure 3:
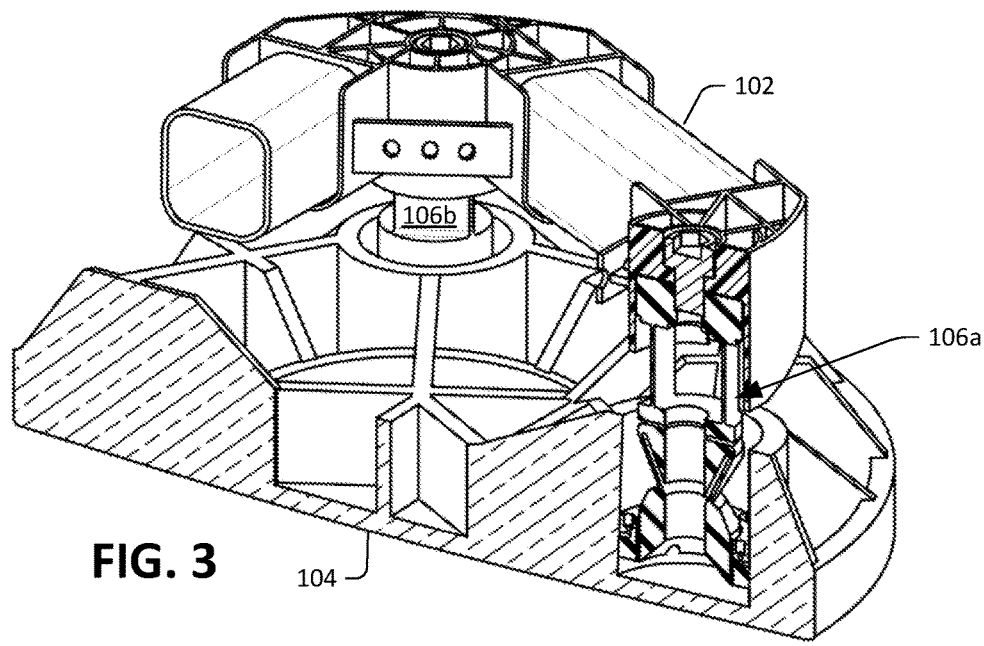
FIG. 3 is a cutaway view of a portion of an optical system.
Figure 4:
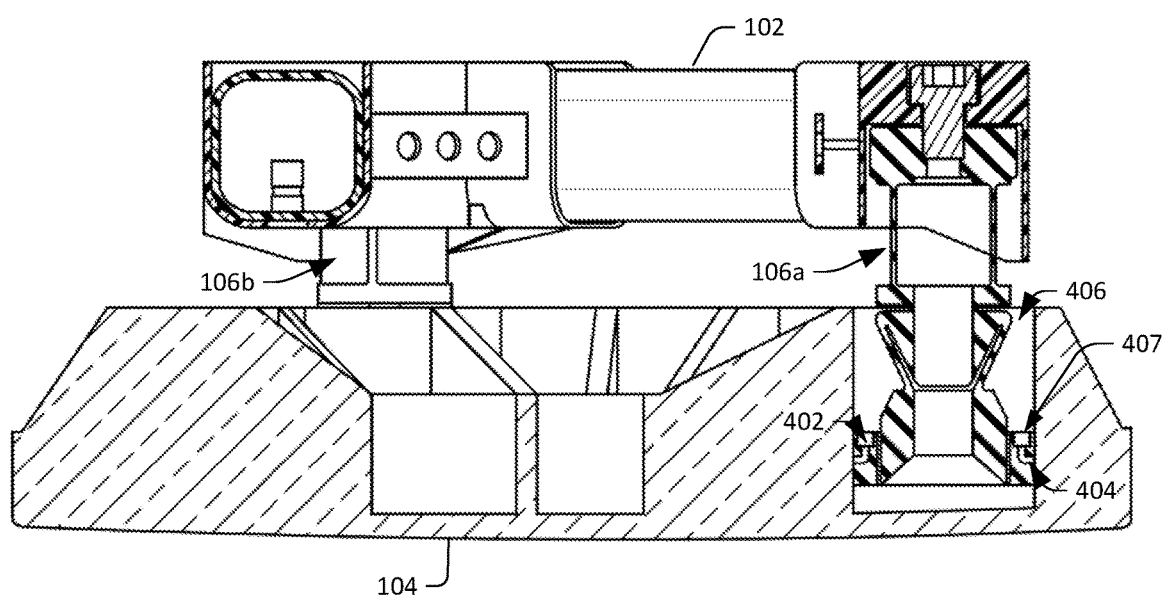
FIG. 4 is a cross-sectional view of a portion of an exemplary optical system.
Figure 5:
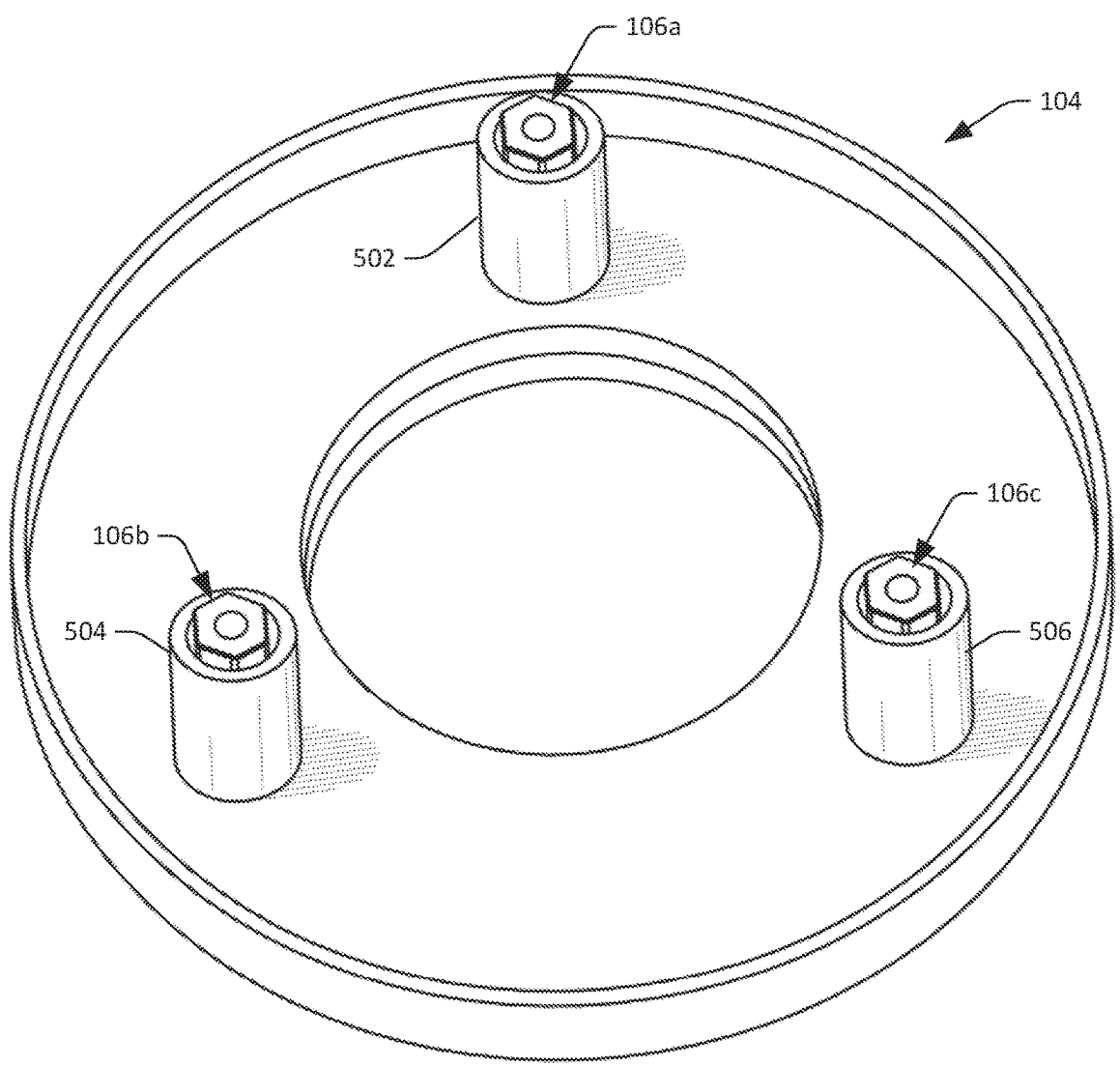
FIG. 5 is an exemplary overhead view of a backside of a precision surface.

Advantages and operation of the flexure mount 106 are now set forth. The flexure mount 106 has a compact design that is well-suited for use with respect to optics or other precision surfaces to handle effects of temperature-induced distortion from the mounting of the mirror 104 to the rigid structure of 102, wherein the mirror 104 and the rigid support structure 102 may have different coefficient of thermal expansion (CTE). As shown in FIGS. 3-5, the flexure mount 106 can be used in a set of three flexure mounts when mounting the mirror 104 to the rigid surface 102. The flexured design of the flexure mount 106 allows for compliance in certain directions to reduce stress buildup normally associated with rigid mounting of dissimilar materials under dynamic thermal environments. The design of the flexure mount 106 provides stress reduction while maintaining the lateral position of the mirror 104.

The global CTE mismatch between the mirror 104 and the rigid support structure 102 is handled through the main flexures 220 and 222 that extend from the second head 204 of the flexure mount 106. A set of three flexure mounts can be assembled, wherein the planar main flexures 220 and 222 of the three flexure mounts are aimed at a common center (e.g., the expansion center of the mirror 104). As the mirror 104 and/or the support structure 102 change size due to thermal expansion, the main flexures 220 and 222 flex in a radial direction (with respect to the expansion center of the mirror 104). This flexing reduces stress while tangential stiffness of the three sets of main flexures provides a kinematic constraint to the expansion center point of the mirror 104. The main flexures 220 and 222 maintain a parallel motion of the mid-shelf of the mount, thereby reducing the transfer of moments into the mirror 104.

The goniometer flexures 216 and 218 of the flexure mount 106 further reduce the transfer of moments into the mirror 104. As illustrated, the goniometric flexures 216 and 218 are nested, wherein the nested set of angled flexures are aimed at the mounting plane of the flexure mount 106 that will be attached at the mass midplane of the mirror 104. This creates a two-dimensional pivot point, which lies in the aforementioned mass midplane (which is coincident with the plane defined by the exit holes of the curved injection tunnels). The goniometric flexures 216-218 are configured to flex in order to relax any rotational motion of the flexure mount 106 relative to the mirror 104.

The radial flexures 206-212 of the flexure mount 106 exist to mitigate the CTE mismatch between the flexure mount 106 itself and the mirror 104. In an embodiment, the flexure mount 106 is to be attached to a cylindrical recess formed on a backside of the mirror 104. The mounting plane of the flexure mount 106 can be aligned with the plane of the center of mass of the mirror 104. The radial flexures 206-212 are configured to relax any stress built up as the recess diameter changes size relative to the flexure mount 106. As indicated previously, curved injection tunnels can be integrated into the radial flexures 206-212 for ease of access when bonding the flexure mount 106 to the mirror 104.

While it was indicated above that the flexure mount 106 can be manufactured by way of additive manufacturing techniques, in other examples the flexure mount 106 is manufacturable through standard machining processes (milling, turning, EDM, etc.), as well as through direct metal sintering (DMLS) additive manufacturing techniques.

With reference to FIG. 3, a cutaway view of a portion of an optical system 300 is depicted, wherein the optical system 300 includes the rigid support structure 102, the mirror 104, and flexure mounts 106a-b, which are used to mount the mirror 104 to the rigid support structure 102. As indicated in the view shown in FIG. 3, the flexure mounts 106a-b are placed equidistant to an expansion center of the mirror 104, wherein an angle formed between the flexure mounts 106a and 106b and the expansion center of the mirror 104 is approximately 120°. Further, as illustrated, a line passing through the centers of the main flexures of the flexure mounts 106 intersect at or proximate to a center axis of the mirror 104.

Referring briefly to FIG. 4, a cross-sectional view of the portion of the optical system is illustrated. The cross-sectional view shown in FIG. 4 depicts curved injection tunnels 402 and 404 that travel through the radial flexures 206 and 210 (FIG. 2) respectively. As indicated above, the exterior surfaces of the radial flexures 206 and 210 can be bonded with the wall of a cylindrical recess 406 by injecting adhesive into entrance holes of the curved injection tunnels 402 and 404 (e.g., entrance hole 407 of curved injection tunnel 404). This causes the adhesive to travel through the injection tunnels and exit the exit holes of the curved injection tunnels 402 and 404, thereby creating bonding pads where the radial flexures 206 and 210 become adhered to the wall of the recess 406. The exit holes are desirably positioned at the mass midplane of the mirror 104.

With reference to FIG. 5, an isometric view of the backside of the mirror 104 is depicted, wherein support ridges have been omitted for purposes of explanation. The backside of the mirror 104 includes three recessed support posts 502-506. Flexure mounts 106a-106c are placed in the recessed support posts 502-506, respectively, wherein radial flexures of the flexure mounts 508-512 can be bonded to the walls of the recesses. FIG. 5 is presented to clearly illustrate that a set of three flexure mounts can be employed to mount the mirror 104 to the rigid support structure 102, wherein the flexure mounts 106a-106c are positioned equidistant to one another and equidistant to a center of expansion of the mirror 104. In other words, from an overhead view, the flexure mounts 106a-106c are vertices of an equilateral triangle centered about the expansion center of the mirror 104.

What has been described above includes examples of one or more embodiments. It is, of course, not possible to describe every conceivable modification and alteration of the above devices for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A flexure mount that is configured to mount a mirror onto a rigid support structure, the flexure mount comprises:
   radial flexures that are symmetrically arranged about a center axis of the flexure mount;
   goniometric flexures that are laterally offset from the radial flexures in a direction along the center axis, the goniometric flexures define a pivot point for the flexure mount; and
   main flexures that are laterally offset from the goniometric flexures in the direction along the center axis, wherein the goniometric flexures are positioned between the radial flexures and the main flexures in the direction along the center axis, and further wherein the flexure mount is monolithic.

2. The flexure mount of claim 1, wherein the radial flexures are T-shaped pads that are configured to interface with a wall of a cylindrical recess on a backside of the mirror, wherein each T-shaped pad has a curved injection tunnel having an entrance hole and an exit hole, the exit hole of the injection tunnel being on an exterior surface of the flexure mount, and further wherein the curved injection tunnel is configured to provide a passageway for an adhesive to be delivered to the exit hole when the T-shaped pads are interfaced with the wall of the cylindrical recess on the backside of the mirror.

3. The flexure mount of claim 2, wherein the exit holes of the curved injection tunnels of the T-shaped pads define a plane, and further wherein the pivot point defined by the goniometric flexures lies in the plane.

4. The flexure mount of claim 1, wherein the main flexures are planar, are in parallel with one another, and are symmetrically arranged about the center axis of the flexure mount.

5. The flexure mount of claim 1 comprised by a telescope.

6. The flexure mount of claim 1, wherein a number of radial flexures in the flexure mount is greater than a number of main flexures in the flexure mount.

7. The flexure mount of claim 1 formed of one of a metal, a plastic, or a ceramic.

8. The flexure mount of claim 1, further comprising:
   a first head that positioned at a first end of the flexure mount, wherein the first head comprises the radial flexures; and
   a second head positioned at a second end of the flexure mount, wherein the main flexures extend from the second head towards the first head.

9. The flexure mount of claim 8, further comprising an aperture that extends through the second head and having a center axis that is coincident with the center axis of the flexure mount, wherein the flexure mount is attachable to the rigid support structure with a fastener that extends into the aperture.

10. The flexure mount of claim 1, wherein a line defined by center points of the main flexures extends through a center axis of the mirror when the mirror is mounted to the rigid support structure by way of the flexure mount.

11. A telescope comprising:
    a mirror having a backside, the backside comprises a support post having a cylindrical recess;
    a rigid support structure; and
    a flexure mount that mounts the mirror to the rigid support structure, wherein the flexure mount comprises:
      a first head positioned at a first end of the flexure mount, wherein the first head comprises a radial flexure, and further wherein the radial flexure is bonded to a wall of the cylindrical recess by way of an adhesive;
      a goniometric flexure that is laterally offset from the radial flexure in a direction along a center axis of the flexure mount;
      a main flexure that is laterally offset from the goniometric flexure in the direction along the center axis, wherein the goniometric flexure is positioned between the radial flexure and the main flexure in the direction along the center axis; and
      a second head positioned at a second end of the flexure mount opposite the first end, wherein the main flexure extends from the second head towards the goniometric flexure, and further wherein the flexure mount is a continuous structure.

12. The telescope of claim 11, wherein the radial flexure is one of several radial flexures included in the first head of the flexure mount, wherein the radial flexures are arranged symmetrically about the center axis of the flexure mount, and further wherein each radial flexure is bonded to the wall of the cylindrical recess by way of the adhesive.

13. The telescope of claim 12, wherein each radial flexure in the radial flexures has an elongated T-shape.

14. The telescope of claim 12, wherein each radial flexure comprises a curved injection tunnel having an entrance hole and an exit hole, wherein the adhesive is injected into the curved injection tunnel at the entrance hole and exits the curved injection tunnel at the exit hole, and further wherein the radial flexure is bonded to the wall of the cylindrical recess by the adhesive that exits the curved injection tunnel at the exit hole.

15. The telescope of claim 11, further comprising two additional flexure mounts, wherein the flexure mounts define an equilateral triangle that is centered about a center of expansion of the mirror.

16. The telescope of claim 11, wherein the flexure mount is formed of one of a metal, a ceramic, or a plastic.

* * * * *